United States Patent [19]

Abysov et al.

[11] Patent Number: 5,092,720

[45] Date of Patent: Mar. 3, 1992

[54] METHOD FOR DETERMINATION OF LONGITUDINAL AND PROFILE MODIFICATION OF TOOL GEAR TOOTH SURFACE

[75] Inventors: Nikolai A. Abysov; Valery A. Bezgodov; Vladimir S. Belgorodsky; Nikolai D. Plotnikov, all of Saratov, U.S.S.R,

[73] Assignee: Saratovskoe Spetsialnoe Konstruktorskoe Bjuro Zuboobrabatyvajuschikh Stankov Saratovskogo Stankostroitelnogo, Ogorodnaya, U.S.S.R.

[21] Appl. No.: 714,330

[22] Filed: Jun. 11, 1991

Related U.S. Application Data

[63] Continuation of Ser. No. 392,933, filed as PCT/SU88/00195, Dec. 24, 1987, abandoned.

[30] Foreign Application Priority Data

Dec. 24, 1987 [SU] U.S.S.R. .............................. 4342345

[51] Int. Cl.⁵ .......................... B23F 19/06; B23F 21/28
[52] U.S. Cl. ........................................ 409/37; 51/287; 407/29; 409/51
[58] Field of Search ............................ 409/37–39, 409/49, 51; 51/105 GG, 287; 407/20, 21, 29

[56] References Cited

U.S. PATENT DOCUMENTS 2,256,586  9/1941  Wildhaber .................... 409/37
3,180,227  4/1965  Schlichthorlein ............. 409/37
3,487,516  1/1970  Pernack et al.

FOREIGN PATENT DOCUMENTS 0037909  5/1982  European Pat. Off. .
564999   8/1975  Switzerland .
199643   8/1967  U.S.S.R. .
956428   4/1964  United Kingdom ............ 409/49
962447   7/1964  United Kingdom ............ 409/37

OTHER PUBLICATIONS

Article, I. I. Semenchenko et al., "Designing of Metal-Cutting Tools" 1963 pp. 792–794 Including English Translation.
P. R. Rodin "Metallorezhuschie Instrumentary", 1986, Vischa Shkola, Kiev.
Tekhnologia Proizvodstva Metallorezhuschikh Instrumentov, "Mashinostroenie", Moscow, 1982.
Abraz Vnoe Iznashivanie, Nauka, Moscow, 1970.

Primary Examiner—Steven C. Bishop
Attorney, Agent, or Firm—Ladas & Parry

[57] ABSTRACT

A method for determination of longitudinal and profile modification of tool gear tooth (I) which linearly meshes with a gear to be machined, wherein modification parameters are determined from the following relationship:

$$\delta = \frac{\Delta pr}{G}$$

where:
$\delta$—the amount of modification of the tool gear tooth (I) in a direction perpendicular to a radius r identifying the location of a contact point on a machining surface (5) relative to a centre (O) of rotation of the tool gear;
p—the requisite change in the normal component of the cutting force;
G—the rigidity of an arrangement providing for synchronous rotation of the gear blank and the tool gear as reduced to the tool gear axis.

2 Claims, 1 Drawing Sheet

METHOD FOR DETERMINATION OF LONGITUDINAL AND PROFILE MODIFICATION OF TOOL GEAR TOOTH SURFACE

This is a continuation of copending application Ser. No. 07/392,933 filed on Aug. 24, 1989, now abandoned and International Application PCT/SU88/00195 filed on Dec. 24, 1987 and which designated the U.S.

TECHNICAL FIELD

The present invention relates generally to mechanical engineering, more specifically to gear manufacturing, and has particular reference to a method for determination of longitudinal and profile modification of tool gear tooth surface. It can find application in various kinds of finishing such as gear honing, shaving, lapping, burnishing, etc.

BACKGROUND OF THE INVENTION

Known in the present state of the art is a tool of gear form for finishing bevel gears (U.S. Pat. No. 2,256,586) which meshes with a bevel gear with its axis offset from and angularly disposed to the axis of the bevel gear to be produced. The method of determination of tooth profile modification involves matching the angle of tooth profile, the tooth spiral angle, and the tooth pitch line with respective parameters of tooth surfaces of the gear to be machined. Employment of such a tool for gear finishing enables the velocity of relative sliding movement between the machining surface and the surface being machined; the normal component of the cutting force; the reduced curvature radii of the tool surfaces contacting the gear to be machined, etc., to be regulated lengthwise on the tooth pitch line only. In other points over the tooth surface, these parameters, however cannot be regulated. As a result, unpredictable departures of tooth surfaces from true profile can be encountered after gear finishing.

According to another prior-art method for determination of gear tooth modification (SU, A, 199,643), the surface of the tool gear tooth envelops that of the gear tooth being machined, and a linear contact is maintained as the tool gear meshes with the gear to be machined. In the course of machining, the tool gear and the gear to be machined are rotated with constant angular velocities (in synchronism).

However, this prior-art method also fails to provide the requisite machining accuracy. During gear honing, lapping, burnishing or other kinds of abrasive finish treatment, the process of metal removal from each of the surfaces machined is similar to abrasive wearing. In the general case, the amount of linear wear can be determined by the following relationship (cf., a textbook "Abrasive Wearing" by N. N. Khrushchev et al, "Nauka" Publishers, 1970, Moscow, p. 96, in Russian):

$$\Delta l = cp\Delta S \quad (1)$$

wherein:
- l—linear wear on the gear blank machined, measured in meters;
- c—proportionality factor which is constant for a given pair of friction members;
- p—normal component of the cutting force, measured in Newtons;
- ΔS—friction length, measured in meters.

In the case of bevel gear honing using a tool of gear form, the friction length ΔS will be directly proportional to the velocity $V_S$ (measured in meters/second) of relative sliding motion between the machining surface and the surface being machined and inversely proportional to the velocity $V_r$ (measured in meters/second) of movement of the contact point along the surface being machined. Then:

$$\Delta l = cp \frac{V_s}{V_r} \quad (2)$$

But the values of $V_s$ and $V_r$, hence Δl will varied at different points of the tooth surface, resulting in nonuniform removal of stock from different portion of the gear blank tooth surface and in uneven wear of the tool gear tooth surfaces, which reduces machining accuracy and tool service life.

The closest to the herein proposed invention is a method for determination of longitudinal and profile modification of tooth surfaces of a tool gear which linearly meshes with a gear to be machined (cf., a textbook "Machine Tool Design" by I. I. Semenchenko et al, "Mashgiz" Publishers, 1963, p. 792-794, in Russian), wherein gear teeth of required shape are obtained due to employment of a tool gear whose tooth profile surface have been properly corrected through modification. The profile of tool gear teeth is modified during tool gear manufacture, to suit the deviations of gear teeth resulting from gear finishing. A requisite profile of the tool gear teeth is determined experimentally on the basis of testing the gears after machining and taking their measurements. This prior-art method involves manufacturing a certain number of test lots of gear blanks produced by tool gears featuring periodic modification of the profile of their teeth after successive finishing operation. Since each type of gear may have its own kind of modification, the above-discussed prior-art method proves to be expensive and will be commercially successful only in mass or large-lot gear manufacture.

SUMMARY OF THE INVENTION

The present invention is aimed at the provision of a method for determination of longitudinal and profile modification of tool gear tooth surface, wherein geometric shape parameters of the machining surface of the tool gear teeth would be determined depending on the performance characteristics of the machine in such as way as to substantially increase the accuracy of gear machining using said tool gear and to extend tool service life.

The above-said object is accomplished due to the fact that in a method for determination of longitudinal and profile modification of the tooth surfaces of a tool gear which linearly meshes with a gear to be machined, according to the invention, the gear blank and the tool gear are rotated in synchronism, while the parameters of longitudinal and profile modification of the machining surface of the tool gear teeth are determined in a plurality of contact points arranged on said machining surface symmetrically with respect to the longitudinal and the profile axes, in accordance with the following relationship:

$$\delta = \frac{\Delta pr}{G}$$

where:
- δ—the amount of modification of the tooth surface of a tool gear in a direction perpendicular to a radius r identifying the location of a contact point on the machining surface relative to the center of rotation of the tool gear, measured in radians;
- Δp—the requisite changes in the normal component of the cutting force, measured in Newtons;
- G—the rigidity where the torsional rigidity is the torque applied to the shaft divided by the turning angle of the driveshaft as a result of the twisting of all shafts of the kinematic train of an arrangement providing for synchronous rotation of the gear blank and the tool gear as reduced to the tool gear axis, measured in newton meter/radian;

whereas Δp is obtained from the following equation:

$$\Delta p = - \frac{p\Delta \frac{V_s}{V_r}}{\frac{V_s}{V_r} + \Delta \frac{V_s}{V_r}}$$

where:
- p—the normal component of the cutting force;
- $V_s$—the velocity of relative sliding motion between the machining surface and the surface being machined, measured in meters/second;
- $V_r$—the velocity of movement of the contact point along the surface being machined, measured in meters/second.

This enables substantial improvement of the accuracy of gear machining using tool gears of said type and extended tool service life.

It is reasonable that the number of contact points used for determination fo modification of the machining surface is selected to be from 5 to 9 provided they are arranged in an area exceeding half the total tooth surface.

This makes it possible to obtain the highest accuracy of modification of the machining surfaces of the tool gear teeth and to take account of any specific features of the tooth profile surfaces of the gear blanks.

BRIEF DESCRIPTION OF THE DRAWINGS

In what follows the present invention will now be disclosed in a detailed description of an illustrative embodiment thereof with reference to the accompanying drawings, wherein.

BEST MODE FOR CARRYING OUT THE INVENTION

The essence of the herein proposed method for determination of longitudinal and profile modification of tool gear tooth surface is as follows.

Figures 1, 3:
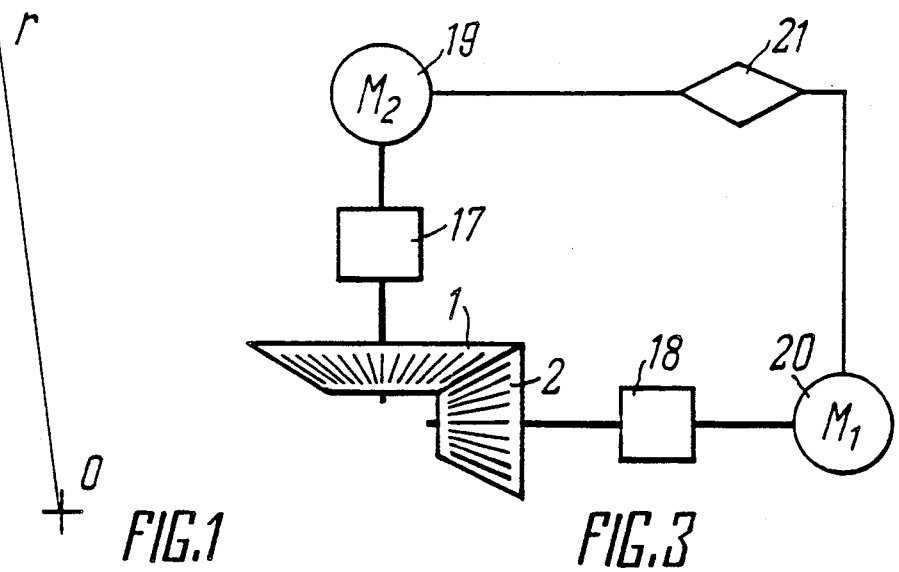
FIG. 1 is a normal cross-sectional view showing the gear blank tooth in mesh with the tool gear tooth, according to the invention.
FIG. 3 is a general diagrammatic view of a machine tool used for carrying the herein proposed method into effect.

The method begins with determination of geometric shape parameters of an abrasive tool or an other tool gear which linearly meshes with the gear to be machined and, for example, has its axis offset from and angularly disposed to the axis of the gear to be machined. Next, the quality of engagement between a tool gear tooth 1 (FIG. 1) and a gear blank tooth 2 is analyzed for reduced clearances; velocities of relative sliding motion between a machining surface 3 and a surface 4 being machined; width and shape of the top land of the tool gear; the amount of undercut of the tool gear tooth 1 provided by the machine tool kinematic train; position of the active flank boundary on the tool gear tooth 1 when in mesh with the gear blank tooth 2, etc., while care is taken to see that the above-said parameters are all within specified limits. A surface 4 of the tool gear tooth 1 is then constructed, and there is found a surface 5 enveloping the surface 3 of the gear blank tooth 2, proceeding from the assumption that the tool gear and the gear blank rotate in synchronism, i.e. at constant angular velocities which relate to each other in the same ratio as that between the number of gear blank teeth 2 and the number of tool gear teeth 1.

It should be particularly emphasized that the cutting process taking place when the gear blank teeth 2 mesh with the tool gear teeth 1 will not be fully described unless the values of velocity $V_s$ of relative sliding motion between the machining surface 3 and the surface 5 being machined, as well as of velocity $V_r$ of movement of contact points 6 to 14 (FIG. 2) of the surface 5 of the tool gear tooth 1 lengthwise the surface 3 (FIG. 1) of the gear blank tooth 2, are defined.

Figure 2:
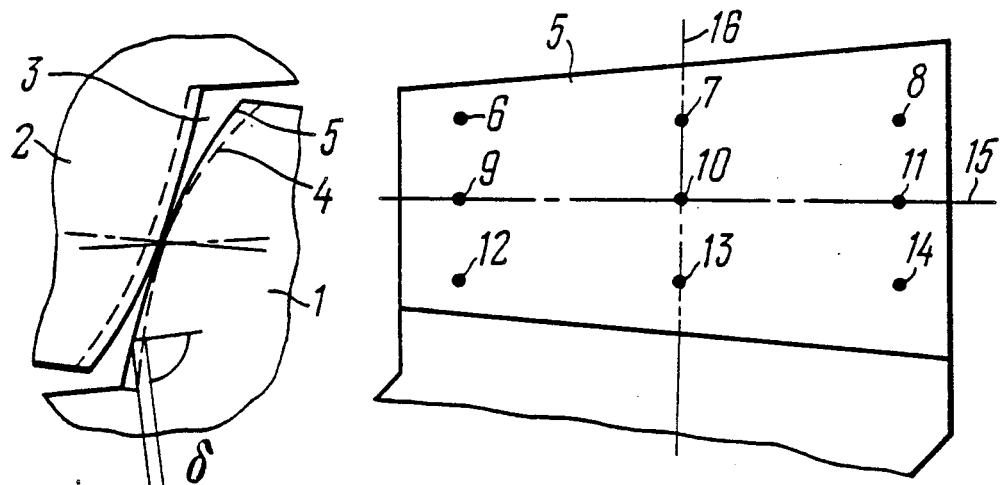
FIG. 2 is a view showing the distribution of contact points on the surface of the tool gear tooth in which longitudinal and profile modification is determined, according to the invention.

The points 6 to 14 (FIG. 2) are arranged symmetrically relative to a longitudinal axis 15 and a profile axis 16 of the surface 5 of the tool gear tooth 1, and they are spread over an area at least half that of the surface 5 of the tool gear tooth 1. FIG. 2 shows an embodiment where nine contact points are used. For some gears, modification of the surface 5 of the tool gear tooth 1 can be determined in as little as five contact points. In such an event, one of the contact points must be located in the center of the surface 5 of the tool gear tooth 1, at the intersection of the longitudinal modification axis 15 and the profile modification axis 16, while the other four contact points are located at the corners of the surface 5 of the tool gear tooth 1 in such a manner that all the contact points should form the so-called envelope whose outline would embrace at least half the surface 5 of the tool gear tooth 1.

However, the rate of metal removal during abrasive machining by a tool of gear having modified tooth profile surfaces depends to a great extent on the rigidity G of the machine tool (FIG. 3) used for gear finishing. In the general case, a machine tool used, for example, for bevel gear honing, comprises kinematic trains 17 and 18 for the tool and the blank, respectively, electric motors 19 and 20 adapted to drive the kinematic trains 17 and 18, and a system 21 for synchronous correction between the motors 19 and 20. The machine rigidity G is reduced to the tool. The requisite modification of the surface 5 (FIGS. 1,2) of the tool gear tooth 1 at contact points 6 to 14 is obtained from the following equation:

$$\delta = \frac{\Delta p r}{G} \qquad (3)$$

where:
- δ—the amount of modification of the tooth surface of the tool gear in a direction perpendicular to a radius r identifying the location of a contact point on the machining surface, measured in radians;

$\Delta p$—the requisite change in the normal component of the cutting force, measured in Newtons;

$r$—the radius identifying the location of the contact point on the machining surface relative to the center of rotation of the tool gear, measured in meters;

$G$—the rigidity where the torsional rigidity is the torque applied to the shaft divided by the turning angle of the driveshaft as a result of the twisting of all shafts of the kinematic train of an arrangement providing for synchronous rotation of the gear blank and the tool gear as reduced to the tool gear axis, measured in Newton meter/radians.

The amount of $\Delta p$ representing the requisite change in the normal component of the cutting force has to be introduced in order to obtain constant linear wear $\Delta l$, thus ensuring uniform metal removal from the entire surface 3 of the gear blank 2. To estimate $\Delta p$, the deviation $$\Delta \frac{V_s}{V_r}$$

from the average value $V_s/V_r$ must be determined for those points of the gear blank tooth 2 which are machined by the contact points 6 to 14 of the surface 5 of the tool gear tooth 1. Thus, the equation (2) can be transformed into:

$$\Delta l = c(p + \Delta p)\left(\frac{V_s}{V_r} + \Delta \frac{V_s}{V_r}\right) \quad (4)$$

The amount of change $\Delta p$ in the normal component of the cutting force required to compensate for the deviation $$\Delta \frac{V_s}{V_r}$$

from its average value can be derived from the equations (2) and (4) by straightforward calculation:

$$\Delta p = -\frac{p \Delta \frac{V_s}{V_r}}{\frac{V_s}{V_r} + \Delta \frac{V_s}{V_r}} \quad (5)$$

where $V_s$ and $V_r$ are measured in meters/second.

The normal component of the cutting force can be changed through modification of the tooth profile surface of the tool gear. In the vicinity of the contact points 6 to 14, portions featuring higher metal removal rates can be withdrawn "inwards" the tool gear 1, or vice versa, thus obtaining modification of the machining surface 4.

INDUSTRIAL APPLICABILITY

Employment of abrasive tools of gear form designed and manufactured according to the herein proposed method, for bevel gear finishing applications, enables the required quality of bearing contact pattern on gear teeth to be obtained without distorting the machined tooth surfaces, which is particularly important for precision mechanical engineering. For example, in gear honing which is extensively used in the aviation industry as a downstream operation after gear grinding, the departure of the tooth surfaces from their true profile due to uneven metal removal from the apex and the root cone surfaces may be responsible for excess spoilage. Tool gears having their working profile surfaces modified according to the herein method permit complete removal of untrue profile stock, inevitably produced after gear grinding, from the gear blank tooth surfaces without the slightest distortion of the geometric shape of the gear teeth to be produced.

A unique advantage peculiar to the herein proposed method resides in the fact that gear finishing tools having modified tooth profile can be obtained analytically, without the need for labor-consuming trial finishing of test gear lots, which renders this method applicable not only in mass and large-lot production but also in small-lot and even piece gear manufacturing. This advantage proves to be particularly important when use is made of tool gear having steel hubs and diamond-charged abrasive layer in view of their high cost.

For bevel gear manufacturers, the herein proposed method of modification of tooth surfaces in tool gears is economically justifiable, since it can be realized in machines featuring different degrees of kinematic interaction between the gear blank spindle and the tool gear spindle, i.e. the machine rigidity. As can be readily seen from the equation (3), the amount of modification of the tool gear tooth profile is inversely proportional to the rigidity G of the machine used for a given gear finishing operation. The greater is the rigidity of the machine intended for finish treatment, the less stringent are the requirements imposed on modification of the tool gear tooth profile. As a result, the method proposed above enables users to attain higher gear accuracy at lower costs.

The herein proposed method for determination of longitudinal and profile modification of tool gear tooth surface can find wide application when employed in other kinds of finish treatment such as lapping, shaving, burnishing, etc.

What is claimed is:

1. A method for determination of longitudinal and profile modification of a tool gear tooth (1) which linearly meshes with a gear to be machined comprising rotating a gear blank and the tool gear in synchronism, while the parameters of longitudinal and profile modification of a machining surface (5) of the tool gear tooth (1) are determined in a plurality of contact points (6 to 14) arranged on said machining surface symmetrically with respect to a longitudinal axis (15) and a profile axis (16), in accordance with the following relationship;

$$\delta = \frac{\Delta p r}{G}$$

where:

$\delta$—the amount of modification of the tool gear tooth (1) in a direction perpendicular to a radius $r$ identifying the location of a contact point on the machining surface (5) relative to a center (0) of rotation of the tool gear measured in radians;

$\Delta p$—the requisite change in the normal component of the cutting force measured in Newtons;

$G$—the rigidity, where the torsional rigidity is the torque applied to the shaft divided by the turning angle of the driveshaft as a result of the twisting of all shafts of the kinematic train, of an arrangement providing for synchronous rotation of the gear blank and the tool gear as reduced to the tool gear axis measured in Newton meters/radians;

whereas: Δp is obtained from the following equation:

$$\Delta p = - \frac{p \Delta \frac{V_s}{V_r}}{\frac{V_s}{V_r} + \Delta \frac{V_s}{V_r}}$$

where:
- p—the normal component of the cutting force measured in Newtons;
- $V_s$—the velocity of relative sliding motion between the machining surface (5) and a surface (3) being machined measured in meters/second;
- $V_r$—the velocity of movement of the contact point along the surface (3) being machined measured in meters/second.

2. A method as claimed in claim 1 wherein the number of contact points used for determination of modification is selected to be from 5 to 9 provided they are arranged on an area exceeding half the total surface of the tool gear tooth (1).

* * * * *